United States Patent
Bishkin

(12) 
(10) Patent No.: US 6,270,675 B1
(45) Date of Patent: Aug. 7, 2001

(54) METHOD FOR USING A WEAK ACID RESIN TO REMOVE DISSOLVED METALS FROM AN AQUEOUS-BASED STREAM

(76) Inventor: David Bruce Bishkin, 209 E. Butterfield Rd., Elmhurst, IL (US) 61026

(*) Notice: Subject to any disclaimer, the term of this patent is extended or adjusted under 35 U.S.C. 154(b) by 0 days.

(21) Appl. No.: 09/253,125

(22) Filed: Feb. 19, 1999

(51) Int. Cl.[7] .................................................. C02F 1/42
(52) U.S. Cl. ........................ 210/662; 210/670; 210/688
(58) Field of Search .................................. 210/662, 670, 210/676, 677, 678, 688

(56) References Cited

U.S. PATENT DOCUMENTS 3,531,401 * 9/1970 Crits ...................................... 210/677
4,235,715 * 11/1980 Wiegert ................................ 210/670

* cited by examiner

Primary Examiner—Ivars Cintins
(74) Attorney, Agent, or Firm—Ted Masters

(57) ABSTRACT

A method (20) for using a weak acid resin (30) to remove dissolved metal from an aqueous-based stream (36), includes reneutralizing the weak acid resin (30) a plurality of times before regeneration of the weak acid resin (30) to remove the taken-up metal. The present method (20) allows up to 30 times greater volumes of water to be run through the same weak acid resin (30) before regeneration with acid is required, and also inherently adjusts the pH of the effluent (40) to an acceptable level of between about 6 and 9.

2 Claims, 6 Drawing Sheets

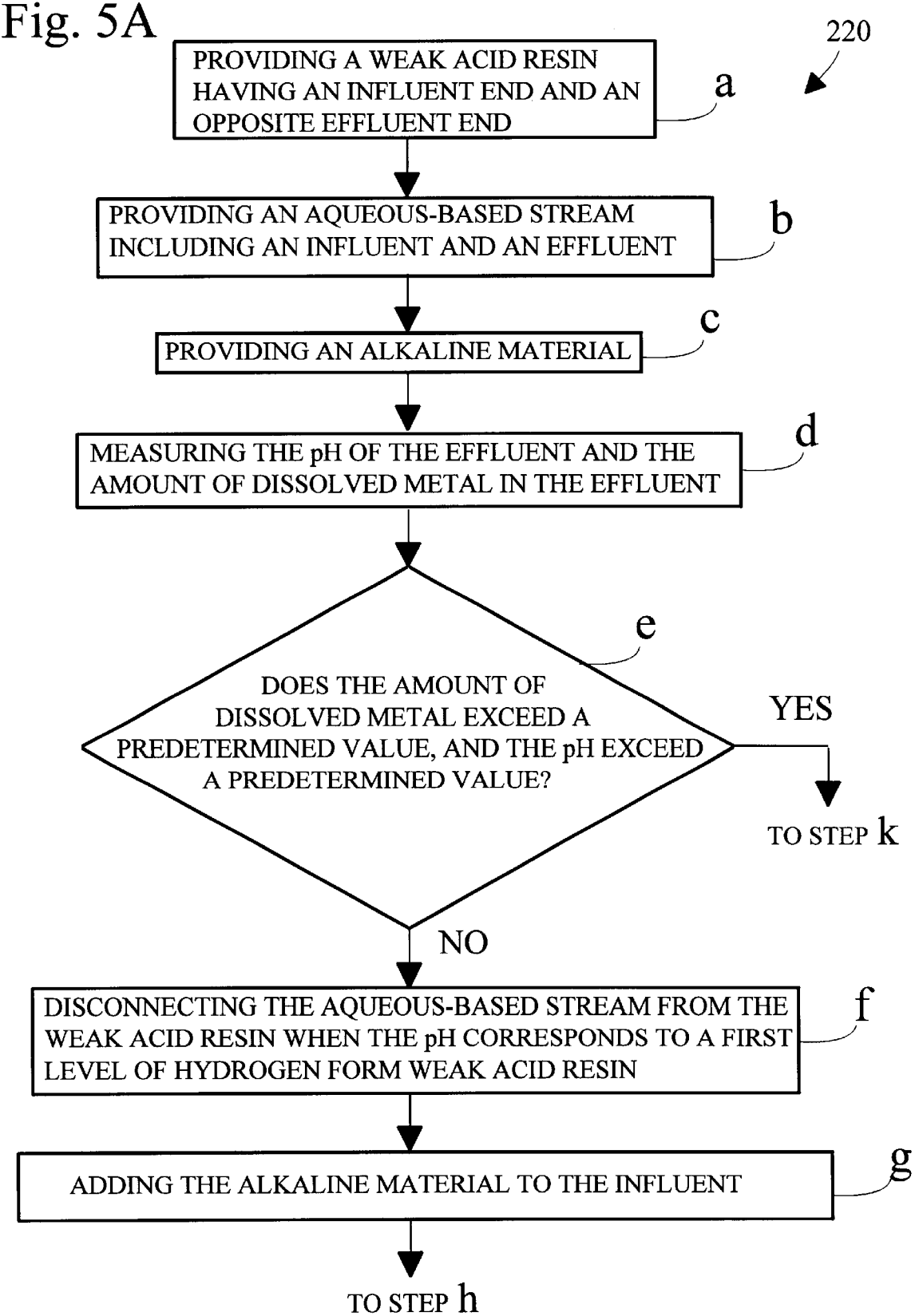

METHOD FOR USING A WEAK ACID RESIN TO REMOVE DISSOLVED METALS FROM AN AQUEOUS-BASED STREAM

TECHNICAL FIELD

The present invention is generally directed to weak acid resin systems, and in particular to a method for reneutralizing the weak acid resin a plurality of times without first regenerating to remove absorbed species.

BACKGROUND ART

The use of weak acid resin to remove dissolved metals from wastewater is well known in the art. The resin comprises a multitude of tiny beads which are placed in a vertically extending container thereby forming a stacked column. The wastewater to be treated is moved through the resin column and the resin absorbs (takes up) the dissolved metal. The wastewater typically enters the top of the resin column and exits at the bottom. The resin beads are prevented from being swept out of the container by a strainer that is located on the downstream end or effluent end of the column.

The general structure of a weak acid resin is typically polyacrylic or polymethacrylic. These two resins are populated by chemically functional groups called carboxylic acids. A carboxylic acid is of the same family as acetic acid and is typically written as —COOH. This is a weak acid as opposed to strong acids such as sulfonic acid (typically written —SOOOH). Both acids will lose their hydrogen ion or proton ($H^+$), a process called deprotonation as shown in the following equations:

—COOH→—COO$^-$+H$^+$, and —SOOOH→—SOOO$^-$+H$^+$  [reaction 1]

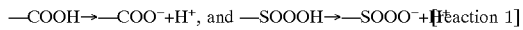

The stronger the acid, the greater is the tendency for the above reaction to proceed. The carboxylic group will only undergo the above reaction at about a pH of approximately 5.5 or greater. The sulfonic group, on the other hand, will undergo the reaction at any pH above about 0.5. This limitation of the weak acid is its hallmark.

To prepare a weak acid resin for removing metal salt, the resin must undergo reaction 2 below. This is typically done by contacting the resin with a sodium hydroxide solution, but can be done with any basic material such as ammonium hydroxide, calcium hydroxide, sodium carbonate, etc. Sodium hydroxide, for example, creates a very high pH condition in the water around the resin, which promotes reaction 2 below.

—COOH+NaOH→—COO$^-$Na$^+$+H$_2$O    [reaction 2]

Dissolved metal ions (written as $M^{++}$) can subsequently be taken up by the resin according to the following reaction:

2(—COO$^-$Na$^+$)+$M^{++}$43 2(—COO$^-$)$M^{++}$+2 Na$^+$    [reaction 3]

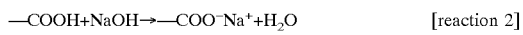

Since the resin is a weak acid and not a strong acid, reaction 4 below cannot proceed because the pH of the surrounding water is too low. Another reason why reaction 4 cannot proceed in the direction indicated is that the species of acid created in the surrounding solution by the hypothetical deprotonation of the carboxylic group would be stronger than carboxylic acid group itself. This is a violation of the second law of thermodynamics.

2(—COOH)+$M^{++}$→2(—COO$^-$)$M^{++}$+2 H$^+$  [reaction 4, won't proceed]

In other words, if the functional groups on the resin are filled with protons ($H^+$) instead of sodium ions ($Na^+$) or calcium ions ($Ca^{++}$) reaction 3 cannot happen and the resin can take up no more metal ions.

Unfortunately metal-bearing wastewater typically has a pH between 1 and 5. When weak acid (instead of strong acid) resin comes in contact with many gallons of this acidic water, the carboxylic function groups on the resin will be converted from the sodium form to the proton form as follows:

—COO$^-$Na$^+$+HCl→—COOH+Na$^+$Cl$^-$    [reaction 5]

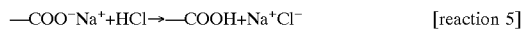

In reaction 5, the HCl acid is neutralized by the sodium form carboxylic group and is converted to the proton form in the process. The by-product is sodium chloride. Reaction 5 is what creates a neutral pH water in the effluent. As more of this acidic water flows through the resin more of the sodium ions are stripped-off the resin and replaced with protons. It can also be shown that the metals on the resin are pushed to the outlet end of the resin column (refer to FIG. 2). Finally, a point is reached when there are no more sodium ions on the resin and reaction 3 or 5 cannot proceed. Instead reaction 4 will occur—but in reverse—and leakage of metal ions will occur in the effluent. At this point, it has been typically assumed that the resin must be regenerated to remove the metals. This is done by adding a strong acid to promote reaction 4 in reverse, which is quite thermodynamically favorable when done with a strong acid. After the resin has been regenerated or placed in its proton form, it can be converted to its sodium ion form by adding an alkaline material such as sodium hydroxide or sodium carbonate in a process called reneutralizing.

As will be seen in the following disclosure and claims, the method of the present invention places the resin in its reneutralized form a plurality of times without first regenerating with acid.

DISCLOSURE OF INVENTION

The present invention is directed to a novel method of using a weak acid resin to remove dissolved metals from a wastewater stream, wherein the weak acid resin is reneutralized numerous times before regenerating the resin with acid. By periodically adding a charge of alkaline material to the resin, up to 30 times greater volumes of wastewater may be treated by the same resin before regeneration with acid is necessary. This prolongs the run cycle and increases the effective capacity of the resin for heavy metals. Further, the present invention eliminates the need for expensive pH adjustments of the influent and/or effluent, by automatically changing the pH of the effluent to an acceptable discharge pH level of between 6 and 9. The present invention also allows the weak acid resin to be used on wastewater heavily laden with dissolved metals by virtue of the fact that the pH of these wastewaters cannot be adjusted upwards to 6 or above without precipitating metal hydroxide and thereby plugging the resin column.

In accordance with a preferred embodiment of the invention, a method for using a weak acid resin column to remove dissolved metal from an aqueous-based stream includes:

(a) providing a weak acid resin having an influent end and an opposite effluent end;

(b) providing an aqueous-based stream including an influent and an effluent, the aqueous-based stream connected to the weak acid resin and passing therethrough;

(c) providing an alkaline material;

(d) measuring a pH of the effluent;

(e) disconnecting the aqueous-based stream from the weak acid resin when the pH corresponds to a first level of hydrogen form weak acid resin;

(f) without regenerating the weak acid resin, adding the alkaline material to the influent end;

(g) discontinuing the adding of the alkaline material when the pH rises to correspond to a second level of hydrogen form weak acid resin;

(h) reconnecting the aqueous-based stream to the weak acid resin; and, (i) repeating steps (d) through (h) a plurality of times.

In accordance with an important aspect of the invention, the first level of hydrogen form weak acid resin is more than substantially 80%; and, the second level of hydrogen form weak acid resin is less than substantially 20%.

In accordance with an important feature of the invention, the effluent is measured to determine the amount of dissolved metal, and when that amount exceeds a predetermined level, the weak acid resin is removed from service and regenerated with acid.

In accordance with another important aspect of the invention, the pH of the effluent is measured concurrently with measuring the amount of dissolved metal, and when both the amount of dissolved metal exceeds a predetermined value and the pH is above a predetermined value, regeneration with acid is performed.

In accordance with another preferred embodiment of the invention, the present method automatically adjusts the effluent pH to a level of between about 6 and 9.

Other features and advantages of the present invention will become apparent from the following detailed description, taken in conjunction with the accompanying drawings, which illustrate, by way of example, the principles of the invention.

MODES FOR CARRYING OUT THE INVENTION

Figure 1:
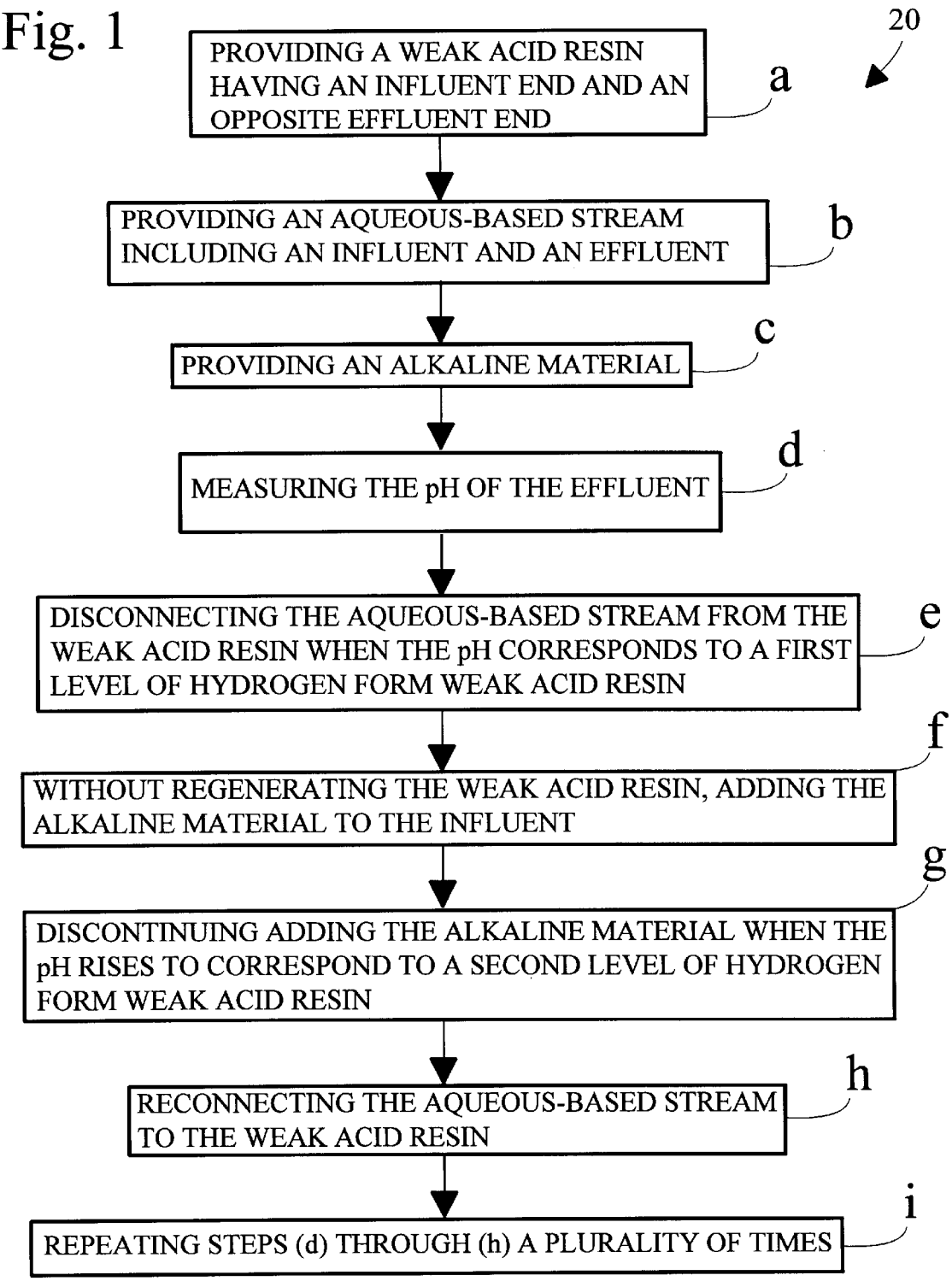
FIG. 1 is a flowchart of a method for using a weak acid resin to remove dissolved metal from an aqueous-based stream in accordance with the present invention.
Figure 2:
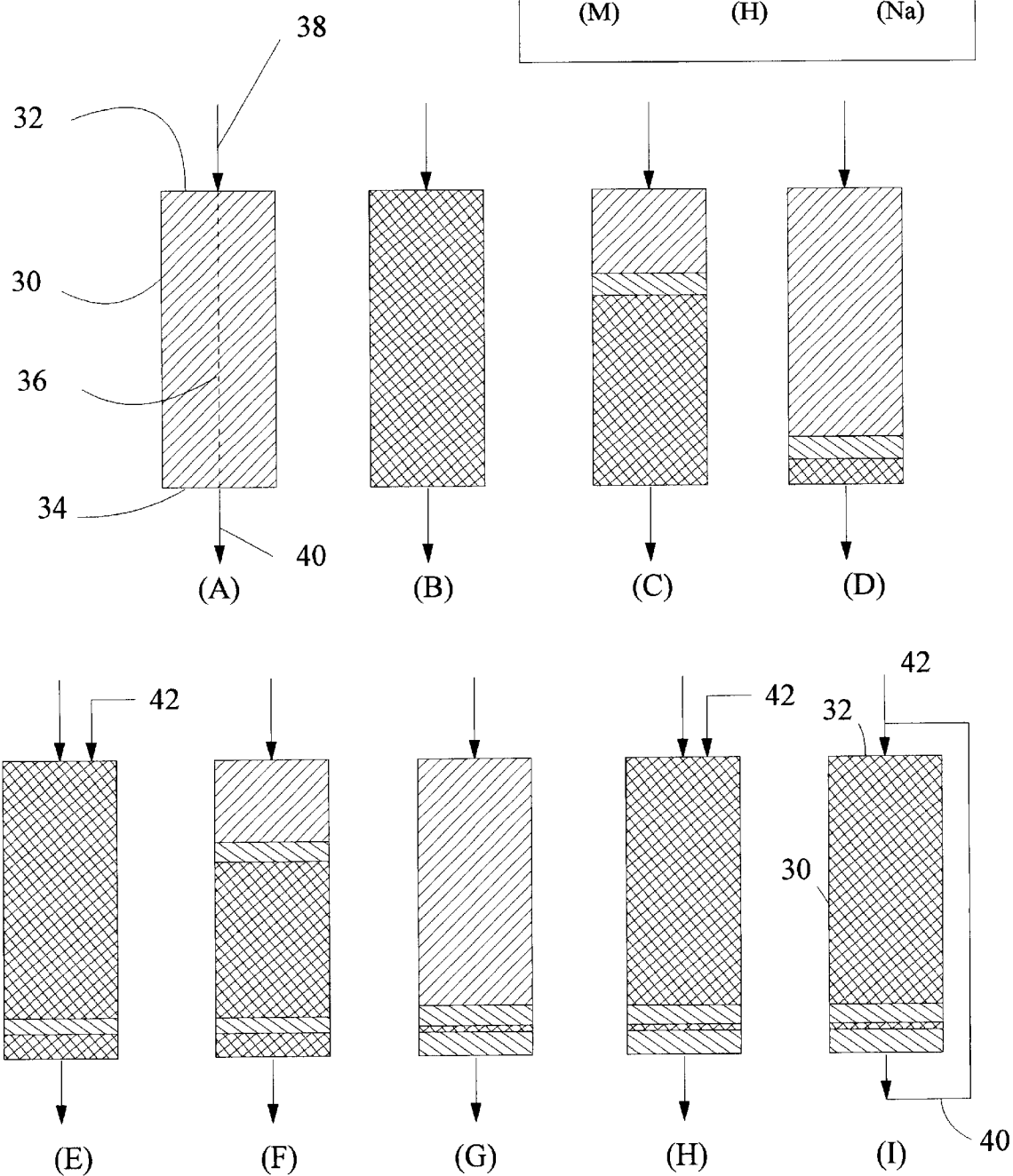
FIG. 2 is a pictorial diagram of the method.

Referring initially to FIG. 1 there is illustrated a flowchart of a method for using a weak acid resin to remove dissolved metal (e.g. Cu, Cd, Ni, Zn, Cr, and Fe) from an aqueous-based stream in accordance with the present invention, generally designated as 20. FIG. 2 is a pictorial diagram illustrating method 20. In step (a), a weak acid resin 30, typically in the form of a column, having an influent end 32 and an opposite effluent end 34 is provided. In step (b), the aqueous-based stream 36 including an influent 38 (which includes dissolved metal) and an effluent 40 passes through the weak acid resin 30. In step (c), an alkaline material 42 such as sodium hydroxide, ammonium hydroxide, or calcium hydroxide, typically in the form of an alkaline-bearing solution, is provided. In step (d), the pH of the effluent 40 is measured. In step (e), the aqueous-based stream 36 is disconnected from the weak acid resin 30 (the weak acid resin column 30 is taken out of service) when the pH of the effluent 40 corresponds to a first level of hydrogen form weak acid resin. In step (f), without first regenerating the weak acid resin 30 with acid, alkaline material 42 is added to the influent end. It is noted that the relationship between the level of hydrogen form weak acid resin and pH is determined through the use of conventional titration curves. In step (g), the adding of alkaline material 42 is discontinued when the pH of effluent 40 rises to correspond to a second level of hydrogen form weak acid resin. In step (h), the aqueous-based stream 36 is reconnected to the weak acid resin 30 (thereby returning the weak acid resin column 30 to service). In step (i) steps (d) through (h) are repeated a plurality of times. In other words, when in step (d) an excessive level of hydrogen form weak acid resin is observed, the weak acid resin 30 is reneutralized instead of using the established procedure of regenerating with acid. The reneutralization process can be repeated numerous times. In this fashion, up to 30 times greater volumes of aqueous-based water 36 can be run through the same weak acid resin 30 before regeneration with acid or other material is required.

After repeated reneutralizations according to the present method, there comes a time when weak acid resin 30 has become saturated with metal ions and can therefore no longer take up metal ions. When this happens, excessive metal ions can be found in the effluent which has passed through the weak acid resin 30. To prevent this undesirable occurrence, in step (d) effluent 40 is also continuously measured to determine the amount of dissolved metal. When the amount of dissolved metal exceeds a predetermined value (level) (this can be any level of metals below that concentration in the influent depending on the metal removal efficiency desired or downstream equipment), the repetition of reneutralization commencing with step (e) is discontinued, and weak acid resin 30 is regenerated with a strong acid or metal-chelating agent in accordance with well know procedures.

FIG. 2(A) shows a weak acid resin column 30, influent end 32, and effluent end 34. Aqueous-based stream 36 containing dissolved metal, and comprising an influent 38 and effluent 40, passes through weak acid resin column 30. Weak acid resin column 30 has been regenerated with acid, and is in a hydrogen form (H).

In FIG. 2(B), weak acid resin column 30 has been neutralized with an alkaline material, and is in a "sodium" form (Na) ready to take up metal ions. As used herein, the term "sodium" form is generic and can also include other metal-accepting forms such as calcium, ammonium, etc.

In FIG. 2(C), weak acid resin column 30 has been "on-line" for a while. Some of the resin's functional groups have taken up metal ions and are in metal form (M). Other functional groups have taken up hydrogen and are in hydrogen form (H).

In FIG. 2(D), the sodium form (Na) resin is depleted, and weak acid resin column 30 can no longer effectively take up metal ions. At this point prior art systems regenerate with a strong acid (e.g. Hcl or metal-chelating agent) to remove the metal (refer to FIG. 2(A). However, the present method does not regenerate at this point, but rather removes the weak acid resin column 30 from service and reneutralizes as is shown in FIG. 2(E).

In FIG. 2(E), weak acid resin column 30 is reneutralized with an alkaline-bearing solution so that the remaining available weak acid resin 30 is placed in the sodium form (Na) and the pH of the effluent will be about 8.5. After reneutralization, weak acid resin column 30 is returned to service. It is important to note that the metal has not been removed from the column.

In FIG. 2(F), weak acid resin column 30 has again been on-line for a while. Some more of the resin's functional groups have taken up metal ions and are in metal form (M). Other functional groups have taken up hydrogen and are in hydrogen form (H).

In FIG. 2(G), the sodium form (Na) is again depleted, and weak acid resin column 30 can no longer effectively take up metal ions. The pH level has dropped to about 6.5. It is noted that there are now two metal "bands" in the column.

In FIG. 2(H), weak acid resin column 30 is again reneutralized so that the remaining available weak acid resin 30 is placed in the sodium form (Na). Again, the metal has not been removed from the column, and now two bands of metal are present. This process of reneutralizing, taking up metal, and reneutralizing may be repeated numerous times before regeneration with acid is necessary.

Referring again to FIG. 1, in steps (e) and (g) a first level of hydrogen form weak acid resin of more than substantially 80%, and a second level of hydrogen form weak acid resin of less than substantially 20% have been found to be practical operational levels, however an unlimited number of other levels are also possible. For example, first and second levels of 60% and 40% respectively would also result in a functional, albeit not as cost effective, system.

After repeated reneutralizations in step (f) according to the present method, there comes a time when weak acid resin column 30 has become saturated with metal ions and can no longer take-up a larger quantity of metal. When this happens, excessive concentrations of metal ions will be present in the effluent. When this happens, metal can "leak" through the column. To prevent this undesirable occurrence, effluent 40 is also continuously measured to determine the amount of dissolved metal. When the amount of dissolved metal exceeds a predetermined value, step (e) is discontinued, and weak acid resin column 30 is regenerated with acid in accordance with well know procedures. In a preferred embodiment, while the metal content is being monitored, the pH of the effluent is also being measured, and when both the metal content exceeds the predetermined value and the pH is above a predetermined value (about 6.6 for polyacrylic and about 7.1 for polymethacrylic), regeneration is deemed appropriate.

Also in a preferred embodiment of the present method, the flow of aqueous-based stream 36 is reversed concurrent with step (f). That is, each time weak acid resin column 30 is reneutralized with alkaline-bearing solution 42, the influent end 32 and effluent end 34 are reversed. This method alternately moves the metal ions toward the opposite end of the column, breaking up the metal concentration, and thereby reducing leakage.

Referring to FIG. 2(I), in another preferred embodiment, prior to steps (f) and (g), the effluent 40 is recirculated to the influent end 42 of weak acid resin column 30. The purpose of this step is to allow weak acid resin 30 to take up any metal in the water inside the column so that when the alkaline-bearing solution 42 is introduced, the column does not become plugged with metal hydroxides. Alternatively, a fresh water stream may be introduced into influent end 42 prior to and during steps (f) and (g) to purge the unwanted metal ions before reneutralizing.

Figure 3:
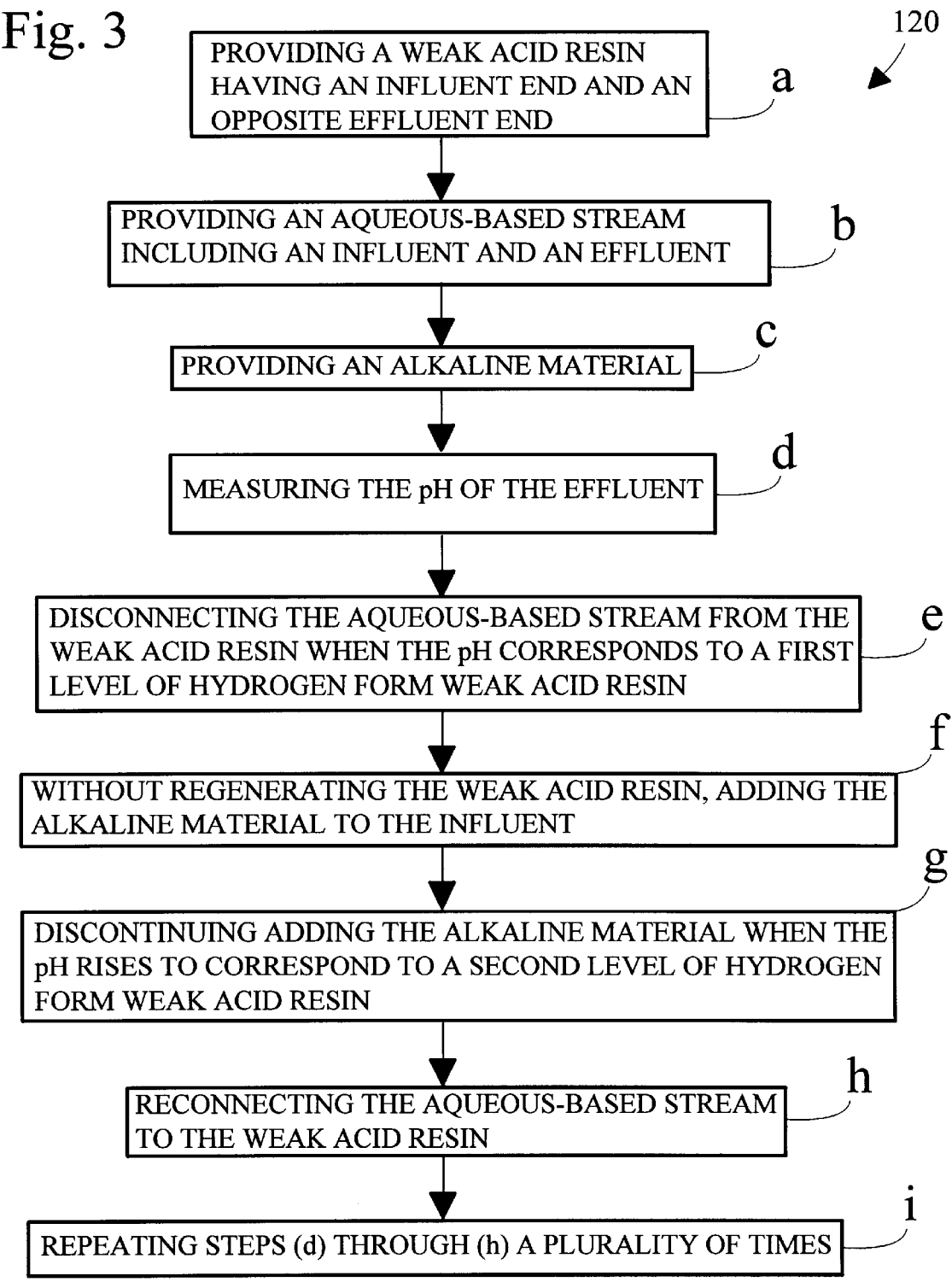
FIG. 3 is a flowchart of a method for adjusting effluent pH in and aqueous-based stream.

FIG. 3 is a flowchart of a method for adjusting effluent pH in and aqueous-based stream, generally designated as 120.

Method 120 is identical to method 20 with the exception that method 120 focuses on another important aspect of the present invention. That is, by performing repeated reneutralizations before regeneration, the present method inherently adjusts the pH of the effluent to an acceptable discharge range of between about 6 and 9. Therefore, the pH of the aqueous-based stream 36 does not have to be monitored and adjusted prior to entering the weak acid resin column 30. This is particularly significant in the case of aqueous-based streams 36 which are heavily laden with metal. In these circumstances, the pH adjustment can result in the precipitation of massive quantities of metal hydroxides which can plug the weak acid resin column 30 and render it inoperative.

Figure 4:
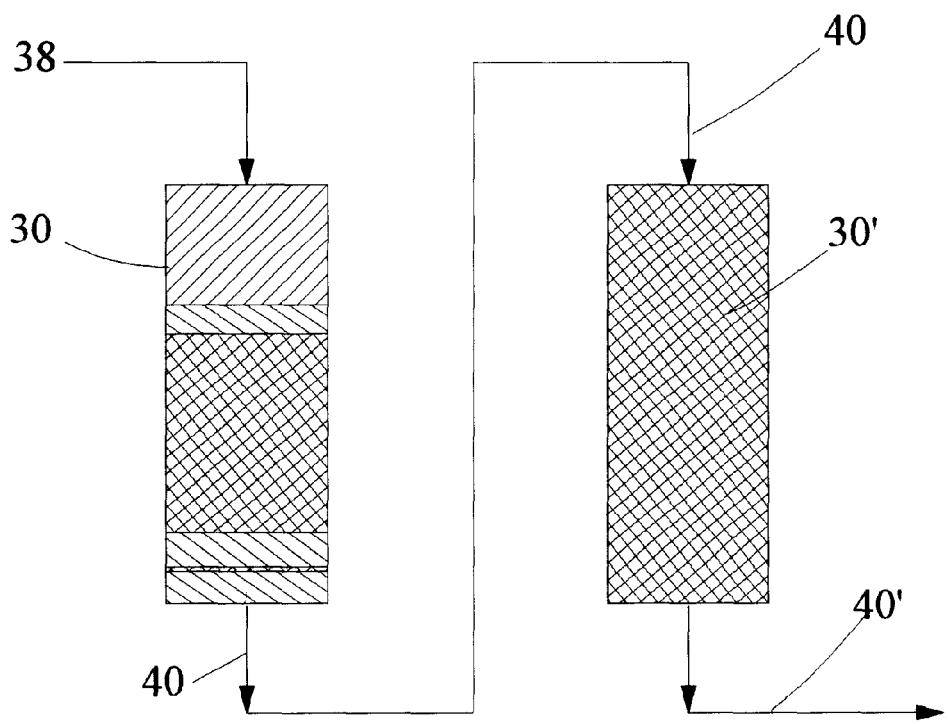
FIG. 4 is a pictorial diagram showing cooperating leading and lagging weak acid resin columns; and, FIGS. 5A and 5B are flowcharts of a method for using a weak acid resin to remove dissolved metal from an aqueous-based stream which includes the process of regenerating the weak acid resin.

FIG. 4 is a pictorial diagram showing cooperating leading 30 and lagging 30' weak acid resin columns. Influent 38 enters leading column 30 and effluent 40 is discharged. Effluent 40 is routed to lagging column 30' and effluent 40 is discharged. Lagging column 30' serves as "backup" or "insurance", wherein metal that may have inadvertently leaked through leading column 30 is taken up in lagging column 30'. In a preferred embodiment, the leading 30 and lagging 30' columns are switched each time the leading column 30 requires regeneration.

Figure 5B:
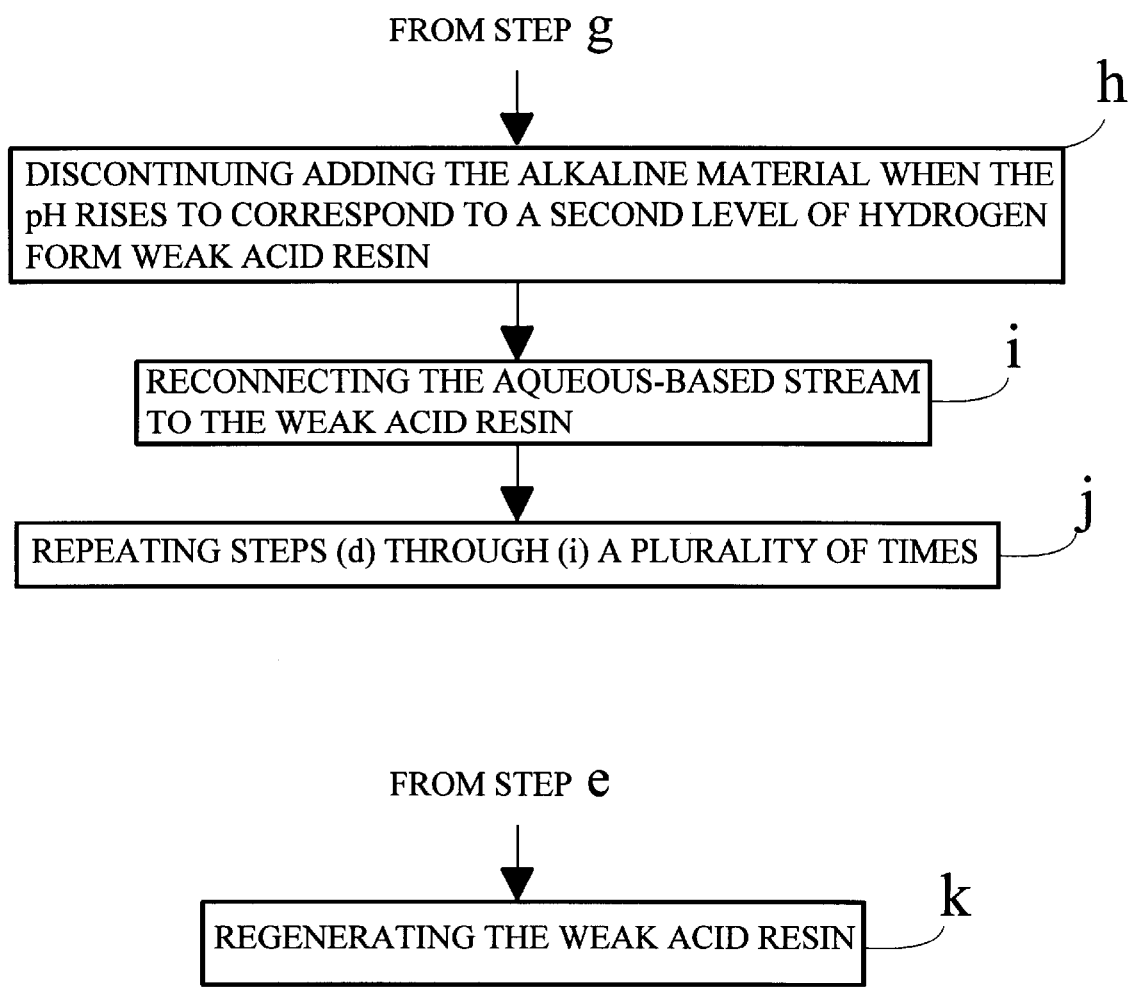

FIGS. 5A and 5B are flowcharts of a method for using a weak acid resin to remove dissolved metal from an aqueous-based stream which includes the process of regenerating the weak acid resin, generally designated as 220. In step (a), a weak acid resin 30, typically in the form of a column, having an influent end 32 and an opposite effluent end 34 is provided. In step (b), the aqueous-based stream 36 including an influent 38 (which includes dissolved metal) and an effluent 40 passes through the weak acid resin 30. In step (c), an alkaline material 42 such as sodium hydroxide, ammonium hydroxide, or calcium hydroxide, typically in the form of an alkaline-bearing solution, is provided. In step (d), the pH of the effluent 40 is measured, and the effluent is also measured to determine the amount of dissolved metal. In step (e), if the amount of dissolved metal exceeds a predetermined value and the pH is above a predetermined value, step (k) is performed (regenerating the weak acid resin). If both of the step (e) criteria are not satisfied, then in step (f), the aqueous-based stream 36 is disconnected from the weak acid resin 30 (the weak acid resin column 30 is taken out of service) when the pH of the effluent 40 corresponds to a first level of hydrogen form weak acid resin. In step (g), without first regenerating the weak acid resin 30 with acid, alkaline material 42 is added to the influent end. It is noted that the relationship between the level of hydrogen form weak acid resin and pH is determined through the use of conventional titration curves. In step (b), the adding of alkaline material 42 is discontinued when the pH of effluent 40 rises to correspond to a second level of hydrogen form weak acid resin. In step (h), the aqueous-based stream 36 is reconnected to the weak acid resin 30 (thereby returning the weak acid resin column 30 to service). In step (j) steps (d) through (i) are repeated a plurality of times. In other words, if in step (d) the measured pH is above a predetermined value (about 6.6 for polyacrylic and about 7.1 for polymethacrylic), and there is too much metal in the effluent 40, the weak acid resin 30 is no longer effectively capable of taking on metal ions even with reneutralization, and regeneration is necessary. Otherwise, repeated reneutralizations may be performed in accordance with steps (d) through (i).

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A method for removing dissolved metal from an aqueous stream, comprising:
   (a) providing a column of weak acid resin, said weak acid resin being in metal-accepting form;
   (b) passing an aqueous stream containing dissolved metal through said column of weak acid resin, thereby (1) producing an effluent stream having a reduced concentration of dissolved metal, and (2) changing an ever increasing portion of said weak acid resin from metal-accepting form to hydrogen form;
   (c) measuring the pH of said effluent stream;
   (d) ceasing to pass said aqueous stream through said column of weak acid resin when said pH of said effluent stream indicates that the amount of hydrogen form weak acid resin has risen to a first level;
   (e) without regenerating said column of weak acid resin, passing an alkaline solution through said column of weak acid resin, thereby (1) producing a second effluent stream, and (2) changing an ever increasing portion of said weak acid resin from hydrogen form to metal-accepting form;
   (f) measuring the pH of said second effluent stream;
   (g) ceasing said passing of said alkaline solution through said column of weak acid resin when said pH of said second effluent stream indicates that the amount of hydrogen form weak acid resin has lowered to a second level; and,
   (h) repeating steps (b) through (g) a plurality of times.

2. A method for removing dissolved metal from an aqueous stream, comprising:
   (a) providing a column of weak acid resin, said weak acid resin being in metal-accepting form;
   (b) passing an aqueous stream containing dissolved metal through said column of weak acid resin, thereby (1) producing an effluent stream having a reduced concentration of dissolved metal, and (2) changing an ever increasing portion of said weak acid resin from metal-accepting form to hydrogen form;
   (c) measuring the pH of said effluent stream, and measuring said effluent stream for an amount of dissolved metal;
   (d) if said amount of dissolved metal exceeds a predetermined value and said pH is above a predetermined value, performing step (j), else performing step (e);
   (e) ceasing to pass said aqueous stream through said column of weak acid resin when said pH of said effluent stream indicates that the amount of said hydrogen form weak acid resin has risen to a first level;
   (f) without regenerating said column of weak acid resin, passing an alkaline solution through said column of weak acid resin, thereby (1) producing a second effluent stream, and (2) changing an ever increasing portion of said weak acid resin from hydrogen form to metal-accepting form;
   (g) measuring the pH of said second effluent stream;
   (h) ceasing said passing of said alkaline solution through said column of weak acid resin when said pH of said second effluent stream indicates that the amount of hydrogen form weak acid resin has lowered to a second level;
   (i) returning to step (b);
   (j) regenerating said column of weak acid resin;
   (k) placing said column of weak acid resin in metal-accepting form; and,
   (l) returning to step (b).

* * * * *